United States Patent

Söderman

[11] Patent Number: 5,866,809
[45] Date of Patent: Feb. 2, 1999

[54] PROCESS FOR CORRECTION OF ENGINE TORQUE DURING GEAR CHANGES

[75] Inventor: Goran Söderman, Södertälje, Sweden

[73] Assignee: Scania CV Aktiebolag, Södertalje, Sweden

[21] Appl. No.: 784,024

[22] Filed: Jan. 15, 1997

[30] Foreign Application Priority Data

Feb. 7, 1996 [SE] Sweden .................................. 9600454

[51] Int. Cl.$^6$ ................................................. B60K 41/08
[52] U.S. Cl. ..................................... 73/117.3; 73/862.191; 73/862.31
[58] Field of Search .................................. 73/1.09, 117.3, 73/862.08, 862.191, 862.29, 862.31; 477/109, 110, 115

[56] References Cited

U.S. PATENT DOCUMENTS

| 5,456,643 | 10/1995 | Yamamoto et al. | 477/110 |
| 5,595,551 | 1/1997 | Hedstrom et al. | 477/109 |

*Primary Examiner*—Richard Chilcot
*Assistant Examiner*—Eric S. McCall
*Attorney, Agent, or Firm*—Ostrolenk, Faber, Gerb & Soffen, LLP

[57] ABSTRACT

A process for correcting the torque to which an engine is adjusted before a gear disengagement, preferably on an automated gear change of a stepped gearbox without using any clutch. Immediately after a gear has been disengaged, the engine is adjusted towards a zero torque ($M_0$) which will maintain the engine speed (n) constant during the gear disengagement. This zero-torque level is stored in a matrix for the relevant operating point given by at least the engine speed (n) and the engine temperature (T). During a fixed measuring period after the gear disengagement when the gearbox is in neutral position, the acceleration of the engine when it is run with the relevant zero torque is detected. Thereafter any acceleration detected is converted to a corresponding torque, which represents an error in the modulated zero torque. The original zero torque value is thereafter corrected by applying the detected incorrect torque so that before a subsequent gear disengagement the engine is modulated with a more correct value of the zero torque ($M_0$).

20 Claims, 3 Drawing Sheets

PROCESS FOR CORRECTION OF ENGINE TORQUE DURING GEAR CHANGES

BACKGROUND OF THE INVENTION

The invention relates to a method for correction of engine torque during automated gear changes of mechanical stepped gearboxes in order to reduce the torque at gear contact points.

STATE OF THE ART

Automatic gear changes of mechanical stepped gearboxes require adjustment of the torque delivered from the engine in order to reduce the torque transferred at the point of contact of the relevant gears. At the time of gear disengagement it is desirable for there to be a torque-free state at the contact point between the relevant gears in the gearbox, but since it is not practically possible to measure the torque at the gear contact point the torque adjustment has to be achieved indirectly by adjusting the torque delivered from the engine.

SE-A-9401653-9 which corresponds to U.S. Pat. No. 5,595,551 refers to a solution whereby gear changing takes place without the disc clutch being released. In this case a gear change is preceded by the engine torque being adjusted towards a zero-torque level with the intention of keeping the engine speed constant during the gear change. The torque with which the engine is modulated is calculated on the basis of available data concerning the engine, its moment of inertia and its internal friction and the like. The modulated torque may also depend on whether any power take-off is operating or not.

A disadvantage of this method is that there is no direct measurement of the torque and that the modulation is based on the expected behavior of the engine. Whether the modulated torque is correct or not is not known. The manufacture of engines and various driveline components may involve tolerance differences which result in each individual vehicle having different characteristics. Even if the behavior of an engine can be predicted correctly when it is new, its characteristics will change over time and with engine wear. This means that the engine torque modulated over time is probably not the same as when the engine was new. This in its turn means that gear changing may become difficult and/or that it is unacceptably delayed in certain circumstances. Oscillations in the control system may result in a very long scaling-in time being required for being able to determine correctly the fuel quantity which gives constant synchronous speed.

SUMMARY OF THE INVENTION

The object of the invention is to be able easily and quickly, on the basis of wear in the system and disparities between different individual systems, to correct a predetermined engine torque during gear changes without using any power sensor or torque sensor, so that there is a torque-free state in the gearbox during gear disengagement. To this end, the invention concerns a process for correcting the torque to which an engine is adjusted before a gear disengagement, preferably on the occasion of automated gear change of a stepped gearbox without using any clutch. Immediately after a gear has been disengaged, the engine is adjusted towards a zero torque ($M_0$) which will maintain the engine speed (n) constant during the gear disengagement. This zero-torque level is stored in a matrix for the relevant operating point given by at least the engine speed (n) and the engine temperature (T). During a fixed measuring period after the gear disengagement when the gearbox is in neutral position, the acceleration of the engine when it is run with the relevant zero torque is detected. Thereafter any acceleration detected is converted to a corresponding torque, which represents an error in the modulated zero torque. The original zero-torque value is thereafter corrected by applying the detected incorrect torque so that before a subsequent gear disengagement the engine is modulated with a more correct value of the zero torque ($M_0$).

Other features distinguishing the invention are indicated in the description below of an embodiment with reference to the attached drawings.

DESCRIPTION OF AN EMBODIMENT

Figure 1:
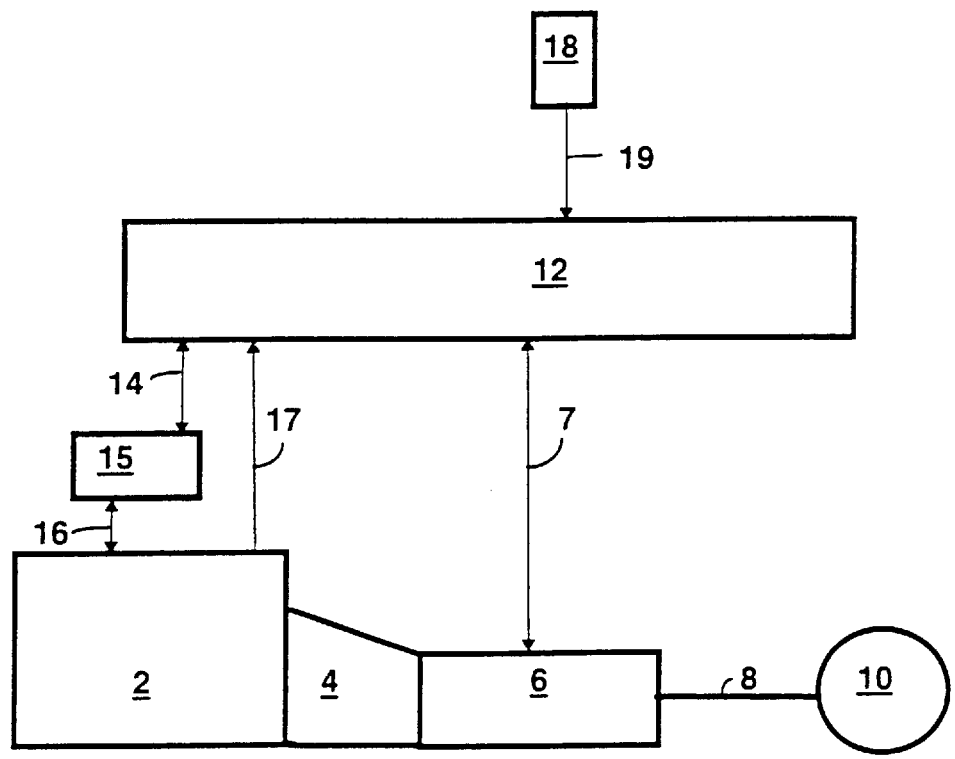
FIG. 1 is a skeleton diagram of the components of a gear change system for mechanical stepped gearboxes.

FIG. 1 depicts a gear change system for monitoring and controlling computer-assisted gear changing of mechanical gearboxes in a motor vehicle. The composition and operation of the system correspond largely to the system described in the previously mentioned SE,A,9401653-2, which corresponds to U.S. Pat. No. 5,595,551, incorporated herein by reference so the only items depicted are those required for understanding the present invention.

The vehicle is powered by a combustion engine 2, preferably a diesel engine, which is connected to the vehicle's driving wheels 10 via a clutch 4, a mechanical stepped gearbox 6 and a propeller shaft 8. In this embodiment the clutch 4 is only intended to be operated manually at low vehicle speeds and when starting and stopping. In gear changing during operation of the vehicle between different running gears, the clutch 4 is intended to be operated neither manually nor automatically, so gear changes take place with the clutch 4 acting as a drive power transmission connection between the engine and the gearbox 6.

The gear change system effects gear changes partly by adjusting the engine speed and engine torque at gear changes and partly by operating the servos in the gearbox which disengage the operative gear and engage the next gear.

The clutch 4 not being released during gear changes results in severe engine control system requirements if gear changes are to take place with the shortest possible torque break in the mechanical stepped gearbox both when what is required is the possibility of torque-free disengagement of a gear and when engaging the next gear, since the engine control system has to ensure that the synchronous speed for the next gear is reached before the gear is engaged.

The gear change system incorporates a control unit 12 with microcomputer which is connected by different lines to various parts of the system. These connections are used for transmitting various signals corresponding to what is illustrated by arrows in FIG. 1. The control unit 12 also has two-way connections in that it sends output signals and receives input signals from a multiplicity of control units via a number of links represented in FIG. 1 by bi-directional arrows.

Via a link 14 with the engine fuel injection system 15, which is in its turn connected to various sensors, the control unit 12 receives information on the engine speed n, from which the engine acceleration a may also be calculated. The control unit 12 also receives via the link 14 information on the modulated engine torque M, which is in practice calculated by means of the fuel quantity injected. The fuel injection system 15 in its turn controls via the link 16 the fuel quantity to the engine injectors. During gear changes the control unit 12 provides the fuel injection system 15 with signals which cause the engine to be modulated with a certain torque M.

The control unit 12 receives from a temperature sensor via a line 17 a signal representing the engine temperature T or, in practice, the temperature of the engine coolant. A sensor 18 provides the control unit 12 via a signal line 19 with information on whether any power take-off (PTO) is operating. In practice this sensor 18 may consist of the circuit-breaker via which the power take-off is connected. In cases where a number of power take-offs are arranged to be driven, they may be correspondingly connected to the control unit, but in this embodiment it is supposed that only one power take-off is involved.

The control unit 12 is connected via a link 7 to various solenoid valves in the gearbox 6 which activate the servos for engagement and disengagement of gears. This link 7 is also used for providing the control unit 12 with signals representing the operating state of the gearbox at the time and indicating which gear is engaged, and, during gear changes, with signals representing the various phases of the gear change.

The control unit 12 is also connected to other vehicle controls (not shown), e.g., gear selector, accelerator pedal, brake pedal, retarder. As the latter operate conventionally and make no difference to the process according to the invention, no further description of them is provided.

Gear changes are initiated entirely automatically if the driver selects an automatic position or manually if the driver selects a manual position. Regardless of how gear changing is initiated (automatically by the control system or manually by the driver), it is effected by the control unit 12 without the clutch 4 having to be released.

As stated in the introduction, it is important when disengaging gears to ensure that the contact point of the relevant gears is not loaded with any torque. The adjustment of engine torque to the so-called zero-torque level before the disengagement of a gear is described in more detail with reference to the flow diagram in FIG. 2. The latter also shows the process according to the invention whereby gear disengagement is followed by correction of the factor $M_G$ which determines the zero-torque level or of the power takeoff factor $M_{PTO}$ which affects the zero-torque level. This torque correction routine is stored in the microcomputer of the control unit 12.

Gear changing is initiated at step 20, after which the control unit 12 starts adjusting the engine torque down to the zero torque $M_0$. The zero torque depends on the engine speed n and the engine temperature T. The control unit therefore has stored in it a basic matrix with various values of the zero torque $M_G$ pertaining to various engine speeds n and temperatures T. At the time of manufacture of the vehicle this basic matrix is stored in the control unit 12 with empirically established values. To compensate for the increased torque requirement during operation of the power take-off, this basic value $M_G$ has to be supplemented by a factor pertaining to the running of the power take-off. This power take-off factor $M_{PTO}$ likewise depends on the engine speed n and the engine temperature T, so the control unit 12 has stored in it a corresponding matrix for various $M_{PTO}$ factors.

The opening step 21 decides whether the power take-off is operating or not. If no power take-off is operating, the adjustment of the zero torque takes place according to the lefthand part of FIG. 2, whereas if one or more power take-offs are operating the adjustment takes place according to the righthand part of the diagram. If no power take-offs are operating, step 22 adjusts the engine torque M to the zero-torque value $M_G$ stored in the basic matrix.

When step 23 finds that the torque has become equal to that desired, step 24 disengages the gear, which is then supposed to take place with zero torque at the gear contact point.

According to the present invention, gear disengagement is directly followed by measurement of the change in the engine speed n during a limited measuring period mp. This measuring period covers a time when the gearbox is in neutral position before the engine is modulated to a suitable speed for the engagement of the next gear. The measuring period thus covers a period of time when the engine is modulated at what is supposed to be a correct zero torque $M_G$. What takes place during the measuring period and directly after it is shown in a common step 25. The measurement of the engine speed change Δn over the measuring period can be combined with knowledge of the measuring period duration Δt to calculate the engine's corresponding acceleration $a_m$. This in its turn means that on the basis of the engine's moment of inertia J it is possible to calculate, by the formula $M_{ERR}=a_m*J$, the torque which causes the speed change. This torque corresponds to the amount by which the supposed torque $M_G$ was incorrect. The value of $M_{ERR}$ will correspond in amount to the value by which the modulated torque has to be corrected. Step 26 thereafter effects an updating of the $M_G$ value stored in the basic matrix by subtracting from the previously stored $M_G$ value the incorrect value $M_{ERR}$ which is stored as a new value of $M_G$ and which in a subsequent adjustment provides a better and more correct value of $M_G$.

Figure 2:
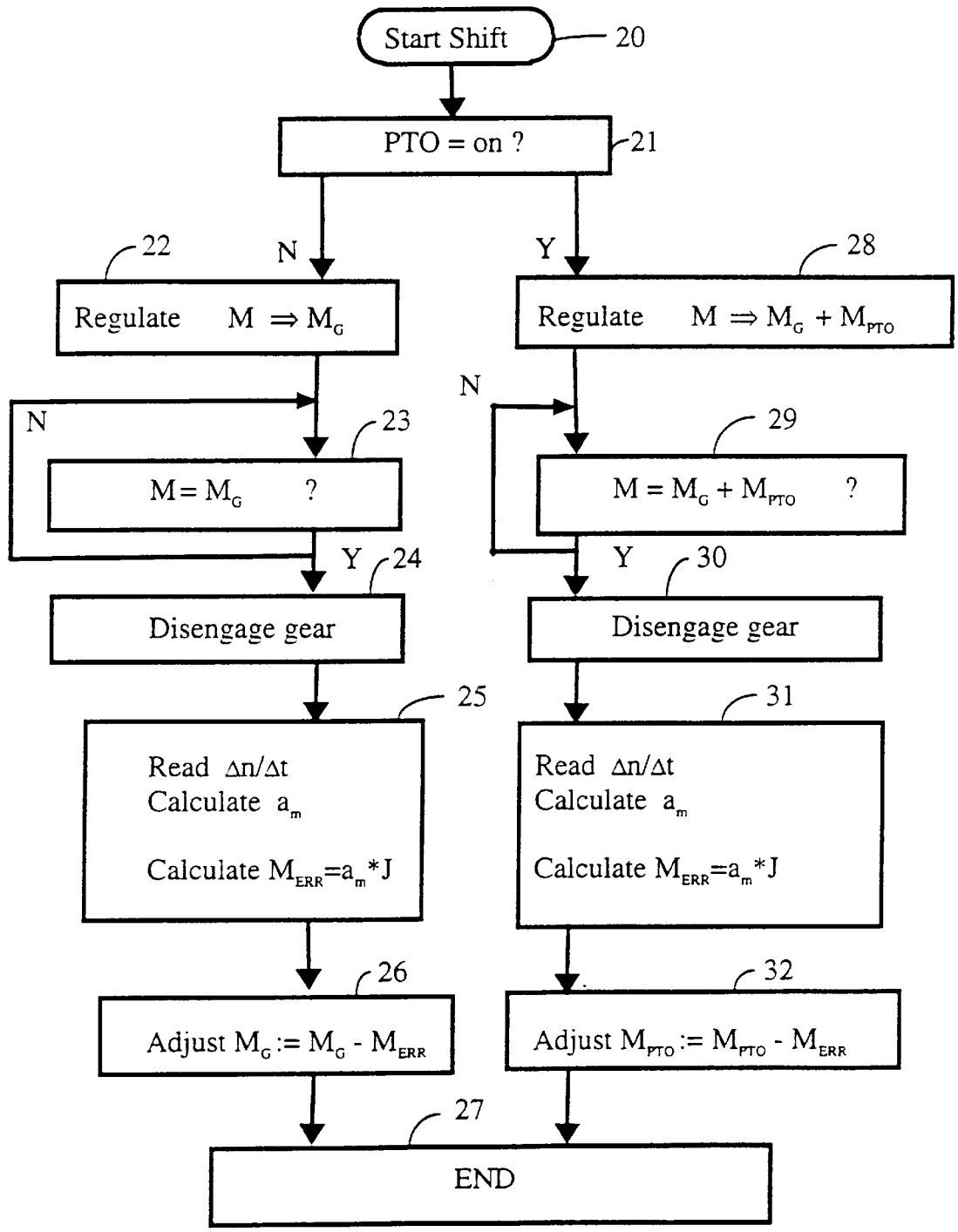
FIG. 2 is a flow diagram for engine torque adjustment during disengagement of a gear in accordance with the invention.

As these torques apply for a certain engine speed n and a certain engine temperature T, the updating is only effected for the relevant speed and temperature values. The process according to the invention for updating the matrix containing the zero-torque values is then complete, as illustrated in FIG. 2 by a final step 27.

If step 21 finds that the power take-off is operating, a higher zero torque $M_G$ is required. Step 28 then modulates the engine towards a zero torque which is the aggregate of a basic torque $M_G$ derived from the basic matrix and a torque $M_{PTO}$ derived from the power takeoff matrix. When this zero torque is reached at step 29, step 30 effects disengagement of the gear. Thereafter step 31 carries out, in a manner analogous with step 25, a calculation of the incorrect torque $M_{ERR}$. This is followed by step 32 updating the power take-off matrix containing the $M_{PTO}$ torque values. It may be noted that the updating takes place in the latter matrix and not in the basic matrix containing $M_G$ torque values. This is because the number of gear changes with no power take-off activated is likely to be significantly greater and because it may be assumed that the basic matrix is probably more correct. The $M_G$ value adopted at step 28 may therefore be supposed to be correct, so the engine speed changes measured during the measuring period are primarily due to incorrect values in the power take-off matrix.

Figure 3:
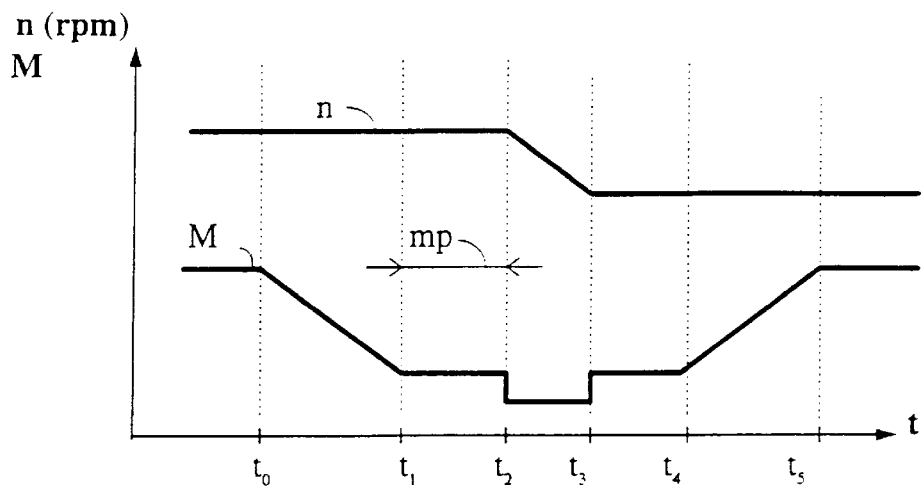
FIGS. 3, 4 and 5 respectively show how engine speed and engine torque vary during a gear change when the zero torque modulated during gear disengagement is respectively too high, too low or correct.
Figure 4:
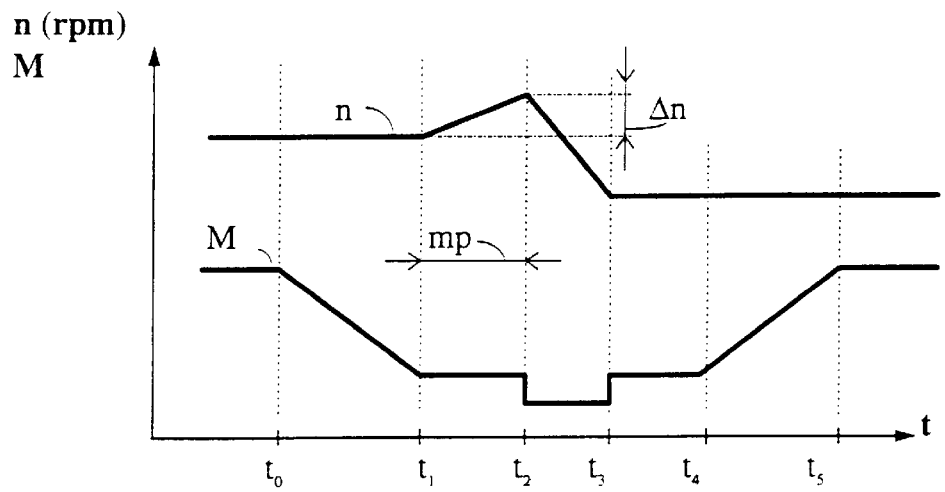
Figure 5:
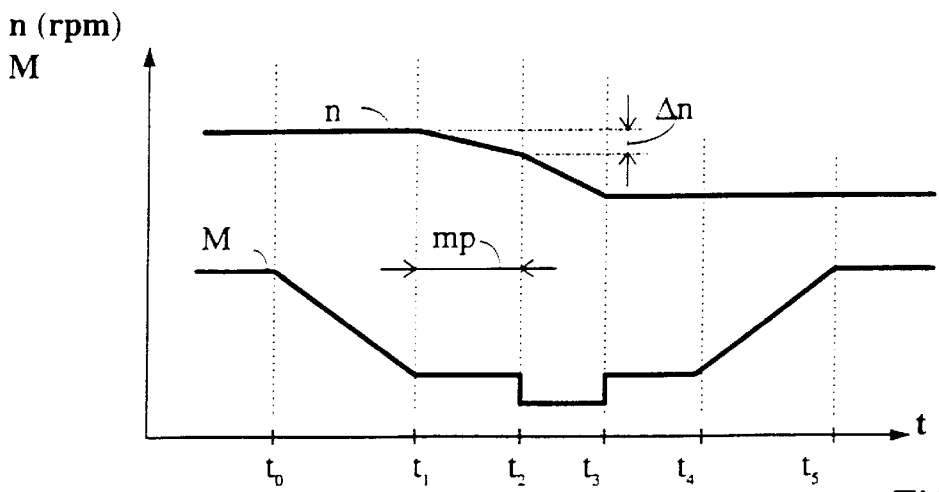

FIGS. 3 to 5 illustrate the gear change pattern described and show how the engine speed may vary therein. The time notations used are the same in all three diagrams. The gear change initiated at time $t_0$ results in the torque M being modulated towards the relevant zero-torque value, either $M_G$ or $M_G+M_pTO$. At time $t_1$ the relevant zero torque is reached and the gear is disengaged. Up to this point the engine speed n has been constant because there has been no change in the vehicle speed. The gear disengagement at time $t_1$ marks the start of the measuring period mp, which in this case is the same length of time as the period of engine modulation by the zero torque and runs to time $t_2$. As may be seen in FIG. 4, the engine speed has increased over the measuring period by Δn, which means that the modulated zero torque was too great, whereas FIG. 5 shows the engine speed having decreased by Δn, which means that the modulated torque was too little. In contrast, FIG. 3 shows the engine speed n remaining constant over the measuring period, so in this case the modulated torque was correct. At time $t_2$ the torque M is ramped down further with a view to reducing the engine speed n to the correct value before the next gear is engaged. In this case the engine speed will decrease, since there is supposed to be an upshift to a higher gear whereby the engine speed after the gear change will be lower than the engine speed before the gear change. Had a downshift been involved, the torque would instead have increased at time $t_2$ in order to increase the engine speed n before the gear engagement. At time $t_3$ the correct engine speed for the next gear has been reached and the gear engagement starts, being completed at time $t_4$. At time $t_4$ the torque is increased so that at time $t_5$ it corresponds to the torque which the driver requires. The whole gear change pattern from time $t_0$ to time $t_5$ is controlled by the control unit 12, and the driver's operation of various controls during that period has no effect on the gear change pattern. After time $t_5$ both torque and engine speed revert to being controlled by an accelerator control operable conventionally by the driver.

The process described for correcting the zero torque can take place continuously during each gear change, but since over time ever fewer and smaller corrections will be required, it is advantageous after a certain time to reduce the number of corrections so that they are not effected at every gear change. The control unit therefore has stored in it a log matrix which indicates how many updates have been effected at the various operating points in the two matrices. When the system is new it is important that it should adapt quickly to the particular engine and, where applicable, the particular power take-off(s). Corrections are therefore always initiated so long as the matrix for the particular operating point does not indicate that a predetermined number of corrections have already been effected. This predetermined number of corrections is determined by how great the deviations are between individual systems, but its order of magnitude in the case of mass-produced systems may be taken to range from a few tens of corrections to 100 corrections.

When the individual system has been subjected to suitable adjustment, the need for initiation of corrections will be less frequent and they will only adjust the torque according to subsequent wear etc. The log matrix may, for example, be used thereafter for counting all gear changes which take place at each operating point, and the initiation of corrections may subsequently take place on a longer time basis depending on the value in the log matrix. For example, correction may be initiated at every gear change for the first 50 gear changes, at every tenth gear change for gear changes 51–300, at every twentieth gear change for gear changes 301–1000, and so on.

Experiments have shown that the length of the preferably fixed measuring period mp can be kept as short as 0.1 second in certain applications. In practical use, however, there may be good reasons for adopting somewhat longer measuring periods, e.g., between 0.1 and 0.4 second, preferably 0.3 second, because the system may be subject to signal delays and inertia in mechanical components.

The $M_G(n,T)$ and $M_{PTO}(n,T)$ matrices contain predetermined operating points whereby the operating points with regard to engine temperature T are divided into steps of 10°–20° C. in the normal engine operating temperature range of about 70°–90° C. and into smaller steps at lower operating temperatures in the range below 70° C., and those with regard to engine speed are divided into steps of 100–200 rpm.

In the correction of the $M_G(n,T)$ and $M_{PTO}(n,T)$ matrices at each relevant operating point at which gear changing and measurement are initiated it is also possible to correct nearby ones (e.g., at least four nearby operating points in the particular matrix) proportionally to the relevant correction torque and to how close the nearby operating points in the matrix are to the particular operating point. If the particular operating point corresponds directly to the operating point in the particular matrix, only the latter operating point is corrected.

In the embodiment described, correction of the zero torques $M_G$ and $M_{PTO}$ was effected in the respective matrices so that in each matrix a new corrected value replaced a previous stored value. In an alternative embodiment it is in each case possible instead to have fixed basic values stored in a basic matrix and have the required corrections stored in a separate correction matrix so that the relevant torque value is formed by the values from these two matrices being combined with one another. In such cases all that is updated is the correction required in the correction matrix.

What is claimed is:

1. Process for correcting engine torque during gear change of a vehicle powered by an internal combustion engine, comprising:

while gears in a gear box are engaged and prior to gear disengagement, adjusting the torque of the engine to a predetermined zero torque level for reducing the torque at gear contact points of the gears;

disengaging the gears;

with the gears disengaged and the gear box in a neutral position, maintaining the torque delivered by the engine at a torque level corresponding to the predetermined zero torque level to remain constant over a measuring period, the measuring period beginning immediately after gear disengagement and having a finite duration Δt;

measuring any speed change in the engine over the measuring period Δt; and correcting the zero torque level according to the speed change detected on the engine over the measuring period Δt.

2. The process of claim 1 further comprising:

correcting the predetermined zero torque level as a correction torque $M_{ERR}$ which is equal to $J*a_m$, where J is the moment of inertia of the engine, $a_m$ is the acceleration of the engine during the measuring period, and $a_m$ is determined by calculating the engine speed change Dn during the measuring period Dt.

3. The process of claim 2, further comprising storing the predetermined zero torque level in a basic matrix with operating points having values dependent upon the engine speed and the engine temperature, and correcting the values of the basic matrix after the measuring period by applying the corrected torque $M_{ERR}$ calculated over the measuring period.

4. The process of claim 3, wherein the basic matrix includes predetermined operating points which with regard to engine temperature are divided into steps of 10°–20° in a normal engine operating temperature range and are divided into smaller steps at lower operating temperatures and wherein the operating points regarding engine speed are divided into steps of 100–200 rpm.

5. The process of claim 3, wherein the measuring period comprises a fixed period of time in the range of 0.1–0.4 seconds and the measuring period starts when the original gear has been disengaged.

6. The process of claim 2, further comprising storing the predetermined zero torque level in a fixed basic matrix based on values empirically selected based on engine speed and engine temperature;

creating a separate correction matrix using values based on at least engine speed and engine temperature and including values based on torque corrections calculated during the measuring period;

computing the zero torque for a gear disengagement by combining the two matrices.

7. The process of claim 6, wherein the basic matrix includes predetermined operating points which with regard to engine temperature are divided into steps of 10°–20° in the normal engine operating temperature range and are divided into smaller steps at lower operating temperatures and wherein the operating points regarding engine speed are divided into steps of 100–200 rpm.

8. The process of claim 6, wherein the measuring period comprises a fixed period of time in the range of 0.1–0.4 seconds and the measuring period starts when the gears have been disengaged.

9. The process of claim 1, wherein the measuring period comprises a fixed period of time in the range of 0.1–0.4 seconds and the measuring period starts when the gears have been disengaged.

10. The process of claim 1, wherein the measuring period comprises a fixed period of about 0.3 seconds and the measuring period starts when the gears have been disengaged.

11. The process of claim 9, wherein the measuring period is selectively calculated at intervals of at most at every gear change and progressively over time at fewer of the gear changes as the operating time of a control system for the gear change increases.

12. The process of claim 11, further comprising storing in a log matrix the number of measuring periods for each operating point having values of engine speed and engine temperature;

modulating the intervals between measuring periods initiated for each operating point so that the intervals increase according to the number of measuring periods executed at a particular operating point.

13. The process of claim 1, wherein a power take-off from the engine is operating, the process further comprising supplementing the torque of the predetermined zero torque level based on a power take-off factor $M_{PTO}$.

14. The process of claim 13, further comprising storing the power take-off factor in a matrix, such that the torque supplementing is stored on the basis of engine speed and engine temperature.

15. The process of claim 14, wherein if a power take-off is operating, correcting the matrix containing the power take-off factor, based on the correction torque $M_{ERR}$ calculated during the measuring period.

16. The process of claim 1, further comprising after the measuring period, adjusting the engine speed to a selected speed level for a new gear into which the gear box is to be changed.

17. The process of claim 16, further comprising engaging the new gear, and maintaining the engine torque at a zero torque level while engaging the new gear.

18. The process of claim 17, further comprising immediately after disengaging the gears, adjusting the engine toward a zero torque to maintain engine speed constant;

storing the zero torque level in a matrix for a relevant operating point of at least engine speed and engine temperature;

following the disengaging of the gears and for a fixed measuring period, detecting the acceleration of the engine when the engine is run with the zero torque for a relevant operating point, and upon detecting any acceleration, converting the acceleration to a corresponding torque representative of an error in the zero torque toward which the engine is adjusted; and correcting the zero torque value that had been stored, by applying the torque representative of an error in the zero torque to bring the torque toward which the engine is adjusted to a zero torque value for a subsequent gear engagement.

19. The process of claim 16, further comprising the steps of:

immediately after the gears have been disengaged, adjusting the engine toward a zero torque to maintain engine speed constant;

storing the zero torque level in a matrix for a relevant operating point of at least engine speed and engine temperature;

following the disengaging of the gears and for the measuring period, detecting the acceleration of the engine when the engine is run with the zero torque for a relevant operating point, and upon detecting any acceleration, converting the acceleration to a corresponding torque representative of an error in the zero torque toward which the engine is adjusted; and correcting the zero torque level that had been stored, by applying the torque representative of an error in the zero torque to bring the torque toward which the engine is adjusted to a zero torque value for a subsequent gear engagement.

20. The process of claim 1, further comprising the steps of:

immediately after the gears have been disengaged, adjusting the engine toward a zero torque to maintain engine speed constant;

storing the zero torque level in a matrix for a relevant operating point of at least engine speed and engine temperature;

following disengaging of the gears and for the measuring period, detecting the acceleration of the engine when the engine is run with the zero torque for a relevant operating point, and upon detecting any acceleration, converting the acceleration to a corresponding torque representative of an error in the zero torque toward which the engine is adjusted; and correcting the zero torque level that had been stored, by applying the torque representative of an error in the zero torque to bring the torque toward which the engine is adjusted to a zero torque value for a subsequent gear engagement.

* * * * *